April 15, 1969   R. M. LABRUYERE   3,438,112

PROCESS OF TIGHTENING GLASS PANES

Filed Oct. 19, 1966

INVENTOR
ROBERT M. LABRUYERE

BY Wenderoth, Lind and Ponack,
ATTORNEYS

United States Patent Office 3,438,112
Patented Apr. 15, 1969

3,438,112
PROCESS OF TIGHTENING GLASS PANES
Robert Maximilien Labruyere, Brussels, Belgium, assignor to UCB (Union Chimique-Chemische Bedrijven) S.A., Brussels, Belgium
Filed Oct. 19, 1966, Ser. No. 587,897
Claims priority, application Belgium, Oct. 20, 1965, 671,131; Sept. 15, 1966, 686,910
Int. Cl. B23p 7/00
U.S. Cl. 29—401                            6 Claims The present invention relates to a method of tightening glass panes.

The new building technics make more and more use of insulating glass panes and all kinds of panels of great dimensions mounted on frames made of various materials, more particularly of metal. The frontages built in this way usually have a certain flexibility that entails a considerable deformation of said frames, whereas the glass panes and the panels themselves remain practically rigid. In order to tighten such an assembly, use can no more be made of traditional putty because this does not give a joint of sufficient flexibility.

It has already been suggested to fix the panes or panels by means of vulcanized rubber sections. These are either self-tightening or are held by some mechanical tightening device. However, such a tightening means remains imperfect. The use of preformed sections is indeed only practical when it is possible to make them in the factory to the exact dimensions of the glass volumes that they are to enframe. It is indeed difficult to adjust these sections to the required dimensions by cutting and inserting them at the working place (building operation). Moreover, as the glass panes do not always have precisely identical dimensions, a tolerance of 4% being admitted, the U section will sometimes be too wide or too narrow with regard to the volume of glass to be tightened, which will be prejudicial to the tightness of the whole. Besides, in this system, tightness depends only on the pressure with which the section is applied on its supporting surfaces. Because of the difference in thickness of the glass or panel foils and because of the vibrations of various intensity due to wind impact and mechanical trepidations, it is extremely difficult to assure perfect tightness by means of vulcanized sections.

Another tightening means, as widely used as the one described hereinbefore, makes use of cold vulcanizing putty, obtained by mixing at the working place, two or more constituents immediately before use. In this system, the glass pane is held within the frame by means of suitable wedges that are thereafter submerged in the mass of vulcanizing putty. The main shortcoming of this technic lies in the fact that tightness depends exclusively on the adherence of the putty to glass and to metal. Since these putties tend to harden progressively, a moment inevitably occurs at which cohesion of the putty becomes greater than its adhesion to glass and to metal. Consequently, in case of a sufficient tension effort, the putty detaches and air, dust and water easily filter in. The surfaces of the joints to be puttied have, moreover, to be rigorously clean in order to obtain a good adhesion, a condition that is far from being always realizable at the working place.

The present invention relates to a new method of tightening glass panes, which has the advantages of the above-described modes of tightening without having their inconveniences.

According to one embodiment of the method of the invention, a fluid composition hardening to an elastic material that does not flow under constraint at room temperature (about 15° to about 30° C.) and that does not adhere, either to the frame or to glass, is poured in the places to be tightened. Said composition is left to harden and is then compressed by means of a suitable mechanical device, which is known per se.

As compared with the vulcanized rubber sections system, the process of the present invention removes the difficulties arising from variations in the dimensions of glass panes and of panels, since the composition applied according to the process of the invention takes the exact shape of the irregularities of both the frame and the panes or panels. In order to obtain perfect tightness, pressure need but to be applied on the compositions by means of any suitable mechanical device, such as a lath having an eccentric screw device allowing the pressure of said lath on the joint to be adjusted, once the latter has acquired its definite consistency. It is evident that the invention is not bound to the nature of the mechanical tightening device that is chosen to squeeze the joint, as any system assuring sufficient compression may be perfectly suitable.

As compared with the cold vulcanizing putty process, the present invention offers the advantage of a tightness that does not depend on the adhesion of the joint, either to the material of the frame or to glass. The composition applied according to the present invention does indeed not adhere either to the frame or to glass and tightness is obtained by compressing the joint.

The composition applied according to the invention must have certain critical properties. First, it must perfectly resist aging, unfavorable weather conditions (rain, frost, sun, ultra-violet rays) as well as the impurities of air pollution (domestic and industrial smokes, noxious gas and vapors, and the like). Moreover, the composition of the invention has to have an initial consistency that allows its application on the joints, frame/glass, or panel in the manner of application of putty, then it has to harden to an elastic material that does not stick or flow under constraint at room temperature, as is the case with the vulcanized rubber sections. The change of the composition according to the invention from the pasty to the rubbery state must also take place at room temperature in the very conditions prevailing at the working place. This change of state must be sufficiently slow to give the workmen who place the glass pane or the panels sufficient time to manufacture the tightening joint and at the same time said change must be sufficiently quick so as to allow the placement of the tightening device some reasonable time later. Compositions having the above described characteristics are, for example, the silicone and polyurethane rubbers. However, it is to be understood that any composition showing the described characteristics may be suitable, whatever its chemical constitution may be.

The accompanying figures, that represent transversal sections of fragments of various glass pane joints, illustrate the invention without limiting its scope.

In these figures, similar parts are designated by the same reference numbers. Thus 1 designates the whole of the glass pane, composed of two glass foils 2 separated from each other by an enclosure 3 under vacuum to assure thermal and acoustical insulation properties. 4 designates the frame and 5 the lath.

Figure 1:
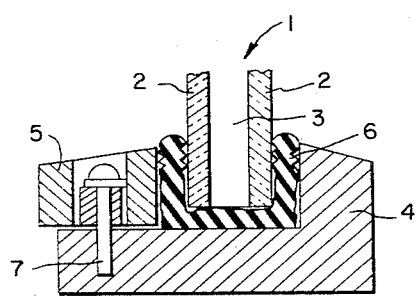
FIG. 1 represents a joint realized with a vulcanized rubber section belonging to the prior art.

In FIG. 1, 6 designates the vulvanized rubber section and 7 the tightening screw of the lath that assures the compression of the section 6 against the glass pane 1.

Figure 2:
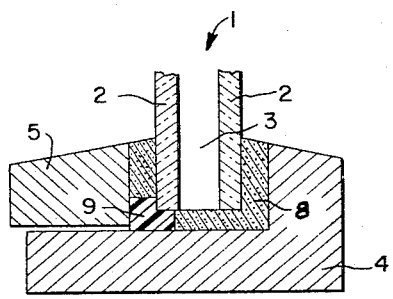
FIGS. 2 and 3 represent two embodiments of vulcanizing putty joints, also belonging to the prior art.
Figure 3:
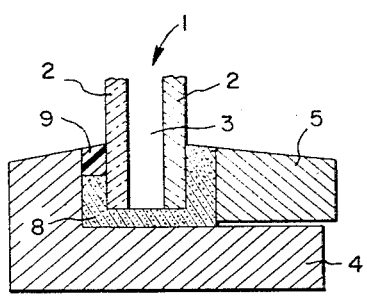

In FIGS. 2 and 3, 8 designates the filling putty and 9 the adhering tightening joint. In FIG. 2, the lath 5 is mounted at the outside of the glass pane and the adhering tightening joint 9 occupies the lower left angle of the joint, whereas in FIG. 3, the lath 5 is at the interior, and the tightening joint is level with the upper part of the frame 4.

Figure 4:
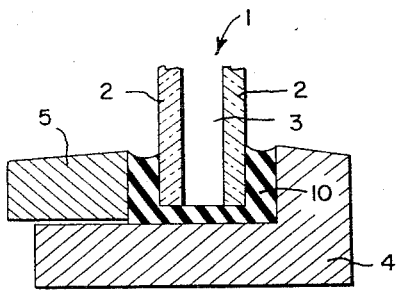
FIGS. 4 and 5 represent the tightening joint realized according to the present invention, immediately after flow (FIG. 4) and after compression (FIG. 5).
Figure 5:
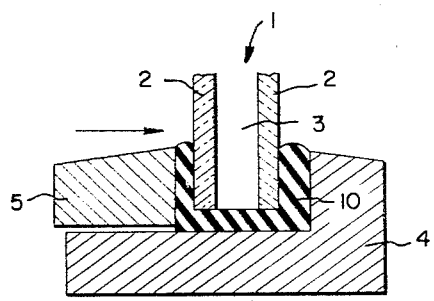

FIG. 4 shows the tightening joint immediately after flow of the composition according to the invention. Notice that the lath 5 is spaced to provide a recess in order to allow the introduction of the composition of matter 10. When latter 10 has acquired its definitive elastic non-sticking consistency, the joint is compressed by approaching the lath to the glass pane as shown in FIG. 5, squeezing by this very fact the composition of matter and assuring thus the tightness of the joint. The tightening movement of the lath may be relieved by any suitable mechanical device (not represented in FIGS. 4 and 5).

According to another embodiment of the method of the invention, compositions may also be used that do not flow under constraint at room temperature but that do adhere to the frame and to the glass pane. Such compositions are, for example, polyurethane rubber containing an adhesion promoter, such as a triisocyanate, as well as silicone rubber to which an adhesion promoter such as an alkyl borate, an amine, an alkyl titanate and the like has been added. The use of adhering compositions according to this latter embodiment of the invention, as compared with the use of non-adhering compositions according to the first embodiment, offers the advantage of an additional factor of security in case of failure of the mechanical joint squeezing system.

What I claim is:

1. Method of tightening window glass panes in a frame, which comprises flowing in the places between said panes and frame to be tightened a fluid composition hardening to an elastic material that does not flow under constraint at room temperature and that does not adhere, either to the frame nor to glass, leaving said composition to harden, and then compressing said hardened elastic material and maintaining said elastic material compressed.

2. Method according to claim 1, in which the fluid composition is silicone rubber.

3. Method according to claim 1, in which the fluid composition is polyurethane rubber.

4. Method of tightening window glass panes, which comprises flowing in the to be tightened places between said panes and frame a fluid composition hardening to an elastic material that does not flow under constraint at room temperature and that adheres to the frame and to the glass pane, leaving said composition to harden, and then compressing said hardened elastic material and maintaining said elastic material compressed.

5. Method according to claim 4, in which the fluid composition is silicone rubber containing an adhesion promoting agent.

6. Method according to claim 4, in which the fluid composition is polyurethane rubber containing an adhesion promoting agent.

References Cited

UNITED STATES PATENTS

| | | | |
|---|---|---|---|
| 1,946,619 | 2/1934 | Furman et al. | 264—262 X |
| 2,628,416 | 2/1953 | Sampson | 264—262 X |
| 2,801,061 | 7/1957 | Logan. | |
| 2,979,788 | 4/1961 | Richardson | 52—400 X |
| 3,061,895 | 11/1962 | Kleinhans | 52—400 |

FOREIGN PATENTS

| | | |
|---|---|---|
| 618,566 | 4/1961 | Canada. |

CHARLIE T. MOON, *Primary Examiner.*

U.S. Cl. X.R.

29—460, 455; 277—1; 52—743, 616, 4, 403